US012566458B2

(12) United States Patent
An

(10) Patent No.: US 12,566,458 B2
(45) Date of Patent: Mar. 3, 2026

(54) RAIL DETECTION APPARATUS AND METHOD FOR AUTONOMOUS DRIVING OF MOBILE ROBOT IN GREENHOUSE ENVIRONMENT

(71) Applicant: ELECTRONICS AND TELECOMMUNICATIONS RESEARCH INSTITUTE, Daejeon (KR)

(72) Inventor: Su Yong An, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 18/714,082

(22) PCT Filed: Oct. 24, 2022

(86) PCT No.: PCT/KR2022/016270
§ 371 (c)(1),
(2) Date: May 28, 2024

(87) PCT Pub. No.: WO2023/101218
PCT Pub. Date: Jun. 8, 2023

(65) Prior Publication Data
US 2025/0036141 A1 Jan. 30, 2025

(30) Foreign Application Priority Data
Nov. 30, 2021 (KR) ........................ 10-2021-0169132

(51) Int. Cl.
G05D 1/661 (2024.01)
G01S 7/48 (2006.01)
(Continued)

(52) U.S. Cl.
CPC .............. G05D 1/661 (2024.01); G01S 17/89 (2013.01); G06V 10/25 (2022.01); *G01S 7/4802* (2013.01);
(Continued)

(58) Field of Classification Search
CPC ... G06T 7/70; G06T 7/11; G06T 2207/10028; G05D 1/661; G05D 2111/17;
(Continued)

(56) References Cited

U.S. PATENT DOCUMENTS

2020/0193195 A1    6/2020  Doria et al.
2021/0195850 A1*  7/2021  Hessel ............... A01G 31/0232
(Continued)

FOREIGN PATENT DOCUMENTS

DE        102020204272 B3      7/2021
KR        10-0784830 B1      12/2007
(Continued)

OTHER PUBLICATIONS

Lars Grimstad et al., "A Novel Autonomous Robot for Greenhouse Applications", 2018 IEEE/RSJ International Conference on Intelligent Robots and Systems (IROS) Madrid, Spain, Oct. 1-5, 2018.

*Primary Examiner* — Jay Khandpur
(74) *Attorney, Agent, or Firm* — Rabin & Berdo, P.C.

(57) ABSTRACT

Provided are an apparatus and method for rail detection and control of a motion of a mobile robot for safely switching driving of the mobile robot between a flat area and a rail area in an environment in a greenhouse in which a rail is provided for pipe heating. For more accurate rail detection, accurate three-dimensional (3D) point cloud data is obtained using a tilting laser scanner and is analyzed to detect a position of the rail and control a motion of a mobile robot for rail docking. The apparatus includes a sensor configured to be mounted in a mobile robot, and a rail detection unit config- (Continued)

ured to obtain 3D point cloud data using the sensor and detect the 3D point cloud data.

14 Claims, 7 Drawing Sheets

(51) Int. Cl.

| | |
|---|---|
| *G01S 7/481* | (2006.01) |
| *G01S 17/89* | (2020.01) |
| *G05D 1/242* | (2024.01) |
| *G05D 107/20* | (2024.01) |
| *G05D 111/10* | (2024.01) |
| *G06T 7/11* | (2017.01) |
| *G06T 7/70* | (2017.01) |
| *G06V 10/25* | (2022.01) |

(52) U.S. Cl.
    CPC .......... *G01S 7/4804* (2013.01); *G01S 7/4817* (2013.01); *G05D 1/242* (2024.01); *G05D 2107/21* (2024.01); *G05D 2111/17* (2024.01); *G06T 7/11* (2017.01); *G06T 7/70* (2017.01); *G06T 2207/10028* (2013.01)

(58) Field of Classification Search
    CPC .... G05D 1/242; G05D 2107/21; G06V 10/25; G01S 7/4802; G01S 7/4804; G01S 7/4817; G01S 17/89
    See application file for complete search history.

(56) References Cited

U.S. PATENT DOCUMENTS

| | | | | |
|---|---|---|---|---|
| 2022/0291383 | A1* | 9/2022 | Ozzo | G01S 17/89 |
| 2023/0033632 | A1* | 2/2023 | Brenner | G06T 7/11 |
| 2024/0165807 | A1* | 5/2024 | Wagner | B25J 9/1669 |

FOREIGN PATENT DOCUMENTS

| | | | |
|---|---|---|---|
| KR | 10-2018-0116832 | A | 10/2018 |
| KR | 10-2020-0071763 | A | 6/2020 |
| KR | 10-2021-0058976 | A | 5/2021 |

* cited by examiner

FIG. 12

RAIL DETECTION APPARATUS AND METHOD FOR AUTONOMOUS DRIVING OF MOBILE ROBOT IN GREENHOUSE ENVIRONMENT

FIELD OF THE INVENTION

The present disclosure relates to rail detection and rail docking motion control for safely switching driving of a mobile robot from a flat area to a rail area and vice versa in a greenhouse (for cultivating tomatoes, bell peppers, or the like) in which there is a rail for pipe heating.

BACKGROUND ART

Mobile robot providing services (such as automatic pest control, crop transfer, crop harvesting, crop image acquisition, etc.) in a greenhouse are based on unmanned autonomous driving. In an environment in a greenhouse for cultivating tomatoes, bell peppers, or the like, a rail for pipe heating is provided unlike in a general indoor environment. The rail is used not only for heating but also as facility for the movement of lift cars for work, trucks for transfer of crops, etc. An autonomous driving-based mobile robot should be capable of driving through all regions of the greenhouse using the rail.

Therefore, it is necessary to safely switching driving of the mobile robot between a flat area and a rail area. To this end, it is necessary to detect an accurate position of the rail on which the mobile robot is to be docked and control a motion of the mobile robot for safe rail docking.

Problem to be Solved

The present disclosure is directed to providing an apparatus and method for rail detection and control of a motion of a mobile robot to safely switch driving of the mobile robot between a flat area to a rail area in a greenhouse (a greenhouse for cultivating tomatoes, bell peppers, or the like) in which there is a rail for pipe heating.

Technical Means to Solve the Problem

To achieve the above object, in the present disclosure, accurate three-dimensional (3D) cloud data is obtained using a 3D sensor (a tilting laser scanner for more accurate rail detection) and analyzed to detect a position of a rail and control a motion of a mobile robot.

Specifically, an aspect of the present disclosure provides a rail detection apparatus for autonomous driving of a mobile robot in an environment in a greenhouse in which a rail is installed on the ground, the apparatus including a sensor configured to be mounted in a mobile robot, and a rail detection unit configured to obtain data about a 3D point cloud using the sensor and detect a position of the rail using the data about the 3D point cloud.

In a certain embodiment, the apparatus may further include a rail docking motion control unit configured to control a docking motion of the mobile robot for the rail, the position of which is detected by the rail detection unit.

Another aspect of the present disclosure provides a rail detection method for autonomous driving of a mobile robot in an environment in a greenhouse in which rails are installed on the ground, the method including obtaining data about a 3D point cloud using a sensor mounted in the mobile robot, and detecting a position of the rail using the data about the 3D point cloud.

In a certain embodiment, the method may further include controlling a rail docking motion to control a docking motion of the mobile robot for the rail, the position of which is detected through the detecting of the rail.

The configuration and operations of the present disclosure described above will be more apparent from embodiments described below in detail in conjunction to the accompanying drawings.

Effect of the Invention

According to the present disclosure, an accurate 3D point cloud can be obtained, an accurate position of a rail can be extracted through rail detection on the basis of the 3D point cloud, and a driving motion of a mobile robot can be controlled to safely dock the mobile robot on the rail.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 12 is a plan view of an environment in a greenhouse for describing selection of a position of a rail to be docked when a number of rails are detected.

DETAILED DESCRIPTION OF EXEMPLARY EMBODIMENTS

Advantages and features of the present disclosure and methods of achieving them will be apparent from embodiments described in detail, in conjunction with the accompanying drawings. However, the present disclosure is not limited to the embodiments set forth herein and may be embodied in many different forms. The embodiments are merely provided so that this disclosure will be thorough and complete and will fully convey the scope of the present disclosure to those of ordinary skill in the art. The present disclosure should be defined by the scope of claims. The terminology used herein is for the purpose of describing embodiments only and is not intended to be limiting of the present disclosure. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements.

1. Overview

Figures 1, 2:
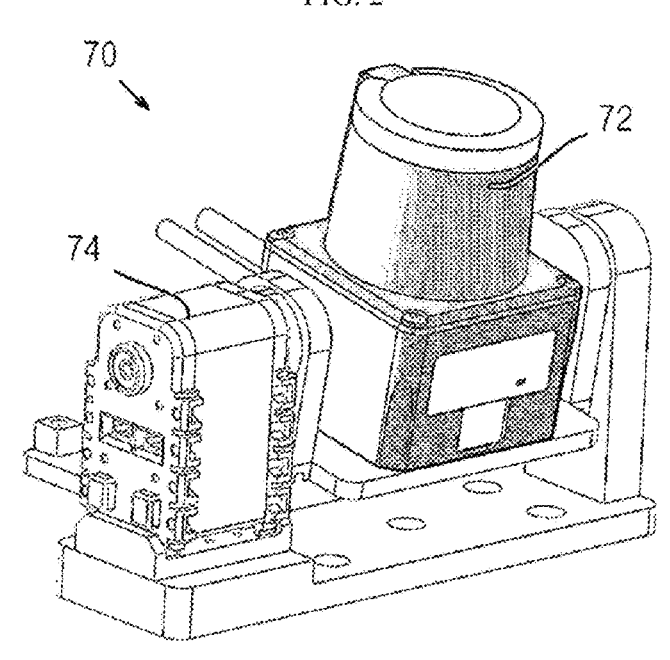
FIG. 1 is a plan view of an environment in a greenhouse in which a rail for pipe heating is installed.
FIG. 2 shows a tilting laser scanner used in the present disclosure.

Functions of a mobile robot applied to a greenhouse may include automatic pest control, crop transfer, crop harvesting, crop image acquisition, and the like. For the functions, it is necessary that the mobile robot be capable of driving through all areas of the greenhouse. However, in a greenhouse for cultivating tomatoes or bell peppers, a rail for pipe heating connected to a hot water supply tube is installed on the ground for heating and thus driving should be safely switched between a flat area and a rail area, unlike in a general indoor environment. FIG. 1 is a plan view for describing in detail an environment in a greenhouse in which rails for pipe heating 10 are installed.

The environment in the greenhouse largely includes a rail area 20 in which the rails 10 for pipe heating are gathered and a flat area 30 excluding the rail area 20. Each of the rails 10 for pipe heating gathered in the rail area 20 is connected to a hot water supply tube 40 to be supplied with hot water and to deliver heat throughout a large area. A crop bed 50 is provided between the rails 10 for pipe heating. An autonomous driving mobile robot 60, which performs pest control, crop transfer and harvesting, image acquisition, etc., performs a task while moving in the greenhouse, and moves between the flat area 30 and the rail area 20. Therefore, a motion of the mobile robot 60 during rail docking needs to be controlled to safely switch driving of the mobile robot 60 between the flat area 30 and the rail area 20, and rail detection should be performed prior to rail docking.

Therefore, rail detection may be performed using an onboard sensor mounted in the mobile robot 60. As the onboard sensor for rail detection, a vision sensor (that performs rail detection using images or an artificial landmark such as a quick response (QR) code), radio-frequency identification (RFID), a 3D light wave detection and ranging (LiDAR) sensor or the like may be used. For more accurate rail detection, a tilting laser scanner may be used. The present disclosure suggests an apparatus and method for obtaining data about a 3D point cloud using such a sensor, analyzing the data to detect a position of the rail 10, and controlling a motion of the mobile robot 60 for rail docking.

In the following description, the rail for pipe heating will be referred to simply as a "rail."

A 3D point cloud should be understood as a set of several points spreading in a 3D space and collected through a sensor. A distance to an object is calculated and points are created by transmitting light or a signal to the object and detecting a time taken to receive the light or signal returning back from the object using a sensor. Data about a 3D point cloud is created from images of the generated points.

2. 3D Scanning Device for Scanning Greenhouse Environment

Basically, a 3D LiDAR sensor or a 3D depth camera (e.g., Intel Realsense L515 or D435i) may be used to obtain a 3D point cloud. However, the 3D LiDAR sensor is difficult to use for detecting a rail for a mobile robot due to a narrow vertical scanning range and high costs. Also, with a 3D depth camera using stereo vision, it is difficult to obtain an accurate 3D point cloud, and a LiDAR-based 3D depth camera is generally a sensor for an indoor environment, the performance of which is low in environments with characteristics of an outdoor environment such as a greenhouse, and thus an accurate 3D point cloud cannot be extracted using the LiDAR-based 3D depth camera.

Therefore, the present disclosure suggests a method of obtaining a high-density and high-precision 3D point cloud by configuring a tilting laser scanner device to adjust a vertical scan range using a two-dimensional (2D) laser scanner and a servo motor.

FIG. 2 shows a tilting laser scanner 70 used in the present disclosure. USS-20LX that is a laser scan distance measuring device manufactured by Hokuyo is used as a 2D laser scanner 72, and AX-18A that is an actuator for robotics, manufactured by Dynamixel is used as a servo motor 74.

Figure 3:
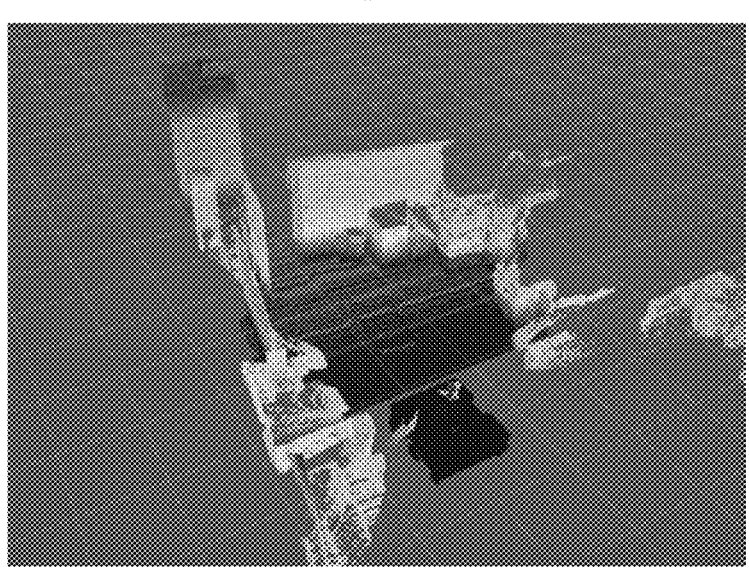
FIG. 3 illustrates data about a three-dimensional (3D) point cloud obtained from the environment in the greenhouse of FIG. 1 using the tilting laser scanner.

FIG. 3 illustrates 3D point cloud data obtained from the environment in the greenhouse of FIG. 1 using the tilting laser scanner 70 in FIG. 2. A scan step, a vertical scanning range, etc. of the tilting laser scanner 70 are adjustable to meet a purpose of obtaining a 3D point cloud.

A method of detecting a rail (a position of the rail) from the 3D point cloud will be described below.

3. Detecting a Rail 10 Using a 3D Point Cloud

Figure 4:
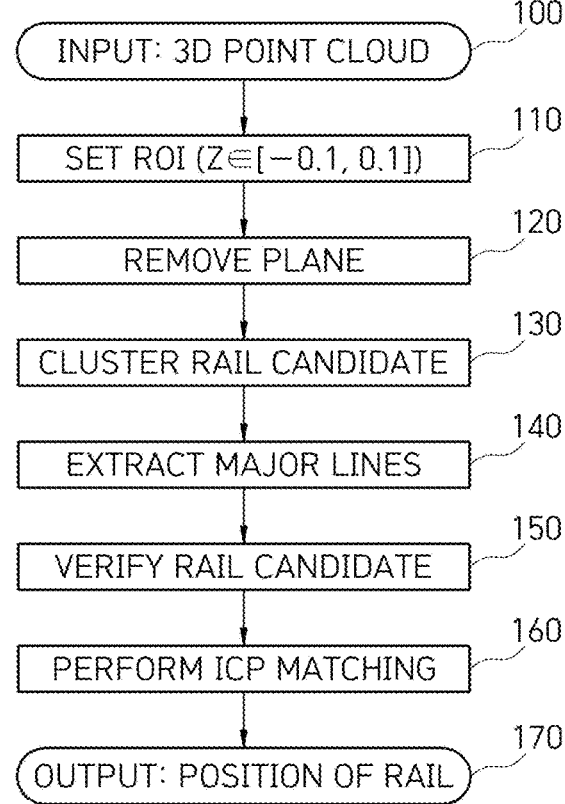
FIG. 4 is a flowchart of a method of detecting a rail from data about a 3D point cloud according to an embodiment of the present disclosure.

A flowchart of a method of detecting a rail from data about a 3D point cloud obtained from a tilting laser scanner is as shown in FIG. 4. Although FIG. 4 describes a method of detecting a position of a rail using a format of a flowchart, a rail detection apparatus according to another aspect of the present disclosure may also be easily implemented through the flowchart of FIG. 4.

A rail detection method and apparatus according to the present disclosure will be described below with reference to FIG. 4.

110: Setting a Region-of-Interest (ROI)

In general, in a greenhouse a rail is installed in contact with the ground or a floor surface. The installing of the rail in contact with the floor surface includes setting an ROI excluding points that are not within a range of a z-axis [−0.1 m, 0.1 m] (m=meter) from among input data about a 3D point cloud using prior knowledge of the position of the rail (see FIG. 5).

Figure 5:
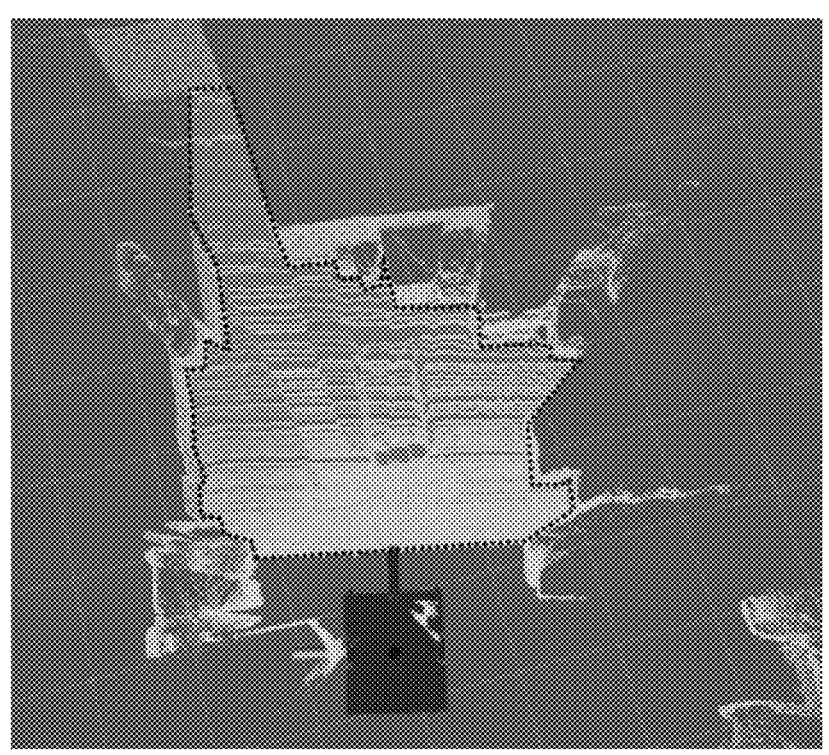
FIG. 5 illustrates an extracted region-of-interest (ROI) point cloud.

FIG. 5 illustrates an example of an extracted ROI point cloud. It can be seen that a point cloud image in which most height components are removed compared to the 3D point cloud of FIG. 3 is extracted.

120: Plane Removal

Figure 6:
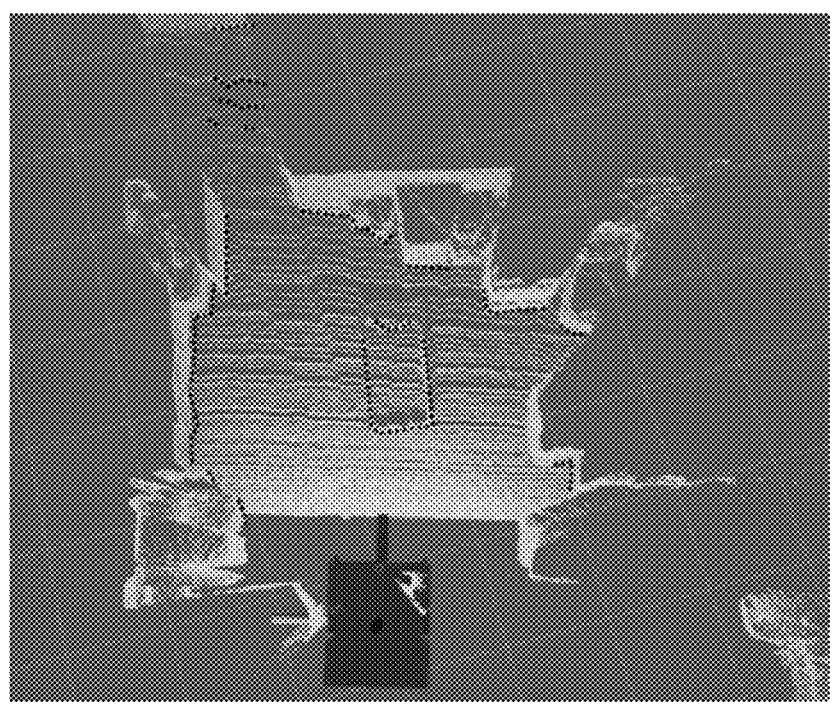
FIG. 6 illustrates an example of data about a 3D point cloud after a plane is removed.

A number of points belonging to the ROI set in operation 110 are on a bottom plane or a side. Therefore, rail candidate points are extracted by removing points belonging to a plane (see FIG. 6). FIG. 6 illustrates an example of data about a 3D point cloud after a plane is removed.

130: Clustering Rail Candidate

Figure 7:
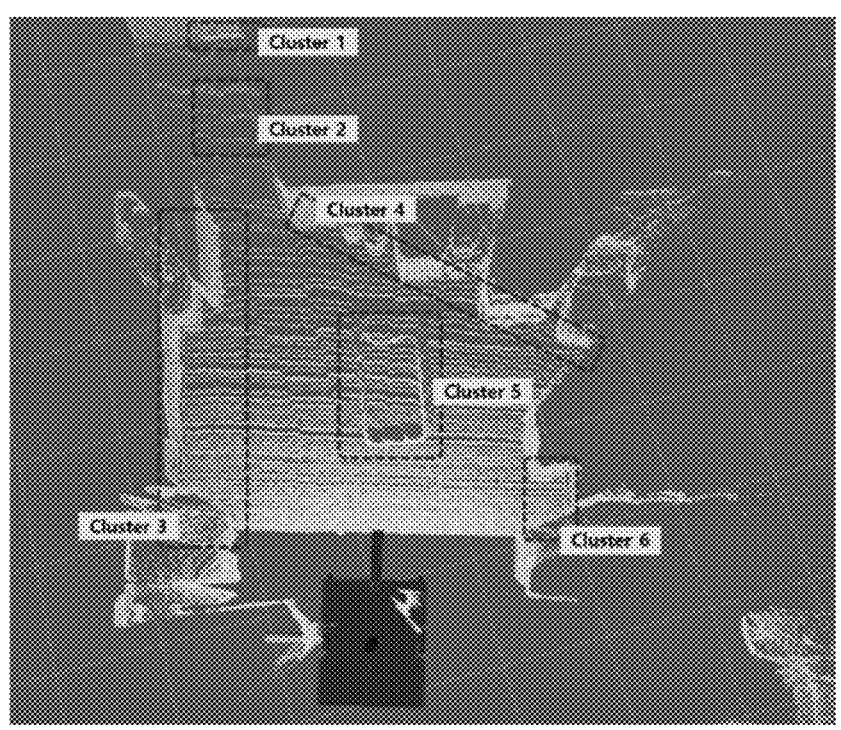
FIG. 7 illustrates an example of rail candidate clusters 1 to 6 generated from data about a 3D point cloud.

By performing "conditional Euclidean clustering" for points remaining after the plane removal (120), points close to each other are gathered in N separate rail candidate clusters (see FIG. 7). However, when the number of points forming a cluster is less than or equal to Ne, the cluster is excluded. In a certain embodiment, $N_c$ may be about 100.

FIG. 7 illustrates an example of rail candidate clusters 1 to 6 generated from data about a 3D point cloud.

Operations described below are performed on units of clusters.

140: Extracting Major Lines in Units of Clusters

Since a rail is installed in the form illustrated in FIG. 1, a minimum number of units that constitute the rail may be two longer segments and one shorter segment (having the same width as the rail) connecting the two longer segments. Using the above fact, two major lines longer than or equal to a length $I_t$ are extracted in units of the generated rail candidate clusters and an angle and length of each of the two major lines are recorded (see FIG. 8).

Figure 8:
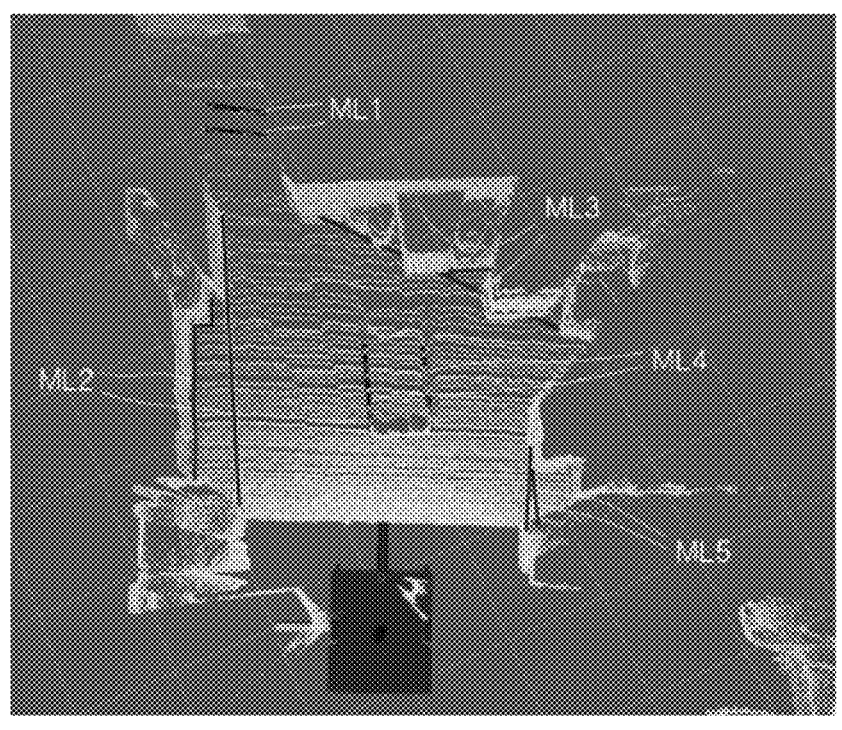
FIG. 8 illustrates an example of major lines ML1 to 5 extracted in units of the clusters in FIG. 7.

FIG. 8 illustrates an example of major lines ML1 to ML5 extracted in units of the clusters in FIG. 7.

150: Validation of Rail Candidate

Whether the rail satisfies the conditions is verified using the prior knowledge that "it is standardized that two segments that constitute a rail for pipe heating should be parallel to each other and a width between the segments should be 0.6 m" and the attributes of the two major lines extracted in operation 140. Specifically, the two major lines are excluded from rail candidates when an angle between the two major lines does not actually meet a parallel condition, e.g., when the two major lines are off by 10° or more, or when the distance between the two major lines is not within 0.5 to 0.7 m (see FIG. 9).

Figure 9:
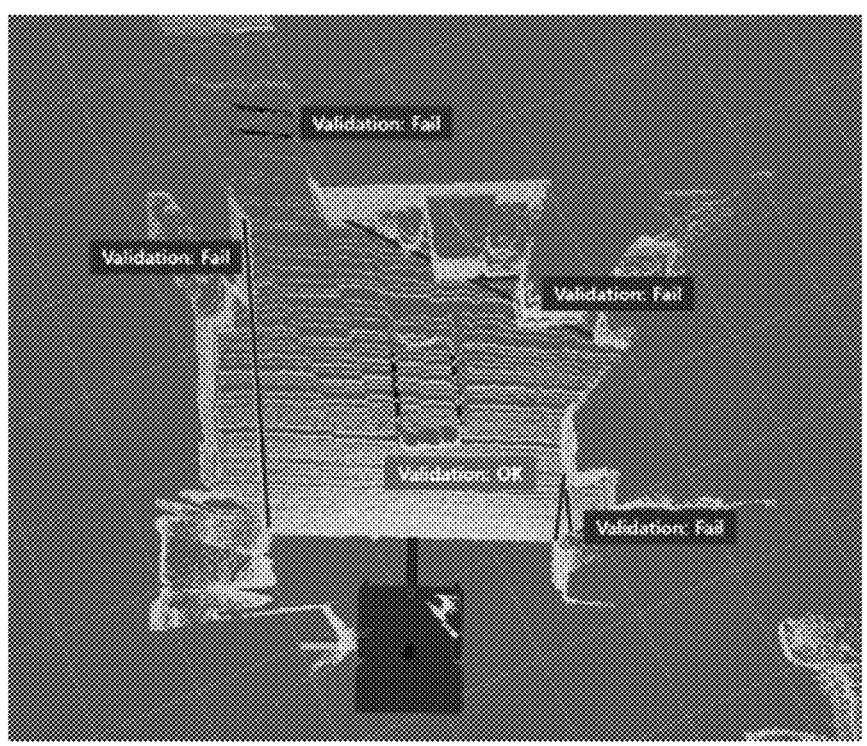
FIG. 9 illustrates a result of rail verification, in which major lines ML1 to 3, and 5 are verified as failures and a major line ML4 is verified as a success.

FIG. 9 illustrates a result of such rail candidate verification showing that rail candidates including major lines ML1 to ML3 and ML5 are verified as failures and a rail candidate including a major line MLA is verified as a success.

160, 170: Detecting Position of Rail by ICP Matching

Since as described above a width of a rail is standardized, a 3D point cloud type rail model may be pre-built. Using the pre-built rail model, the position of the rail is detected by performing iterative closest point (ICP) matching on the 3D point cloud of the verified rail candidates (see FIG. 10).

Figure 10:
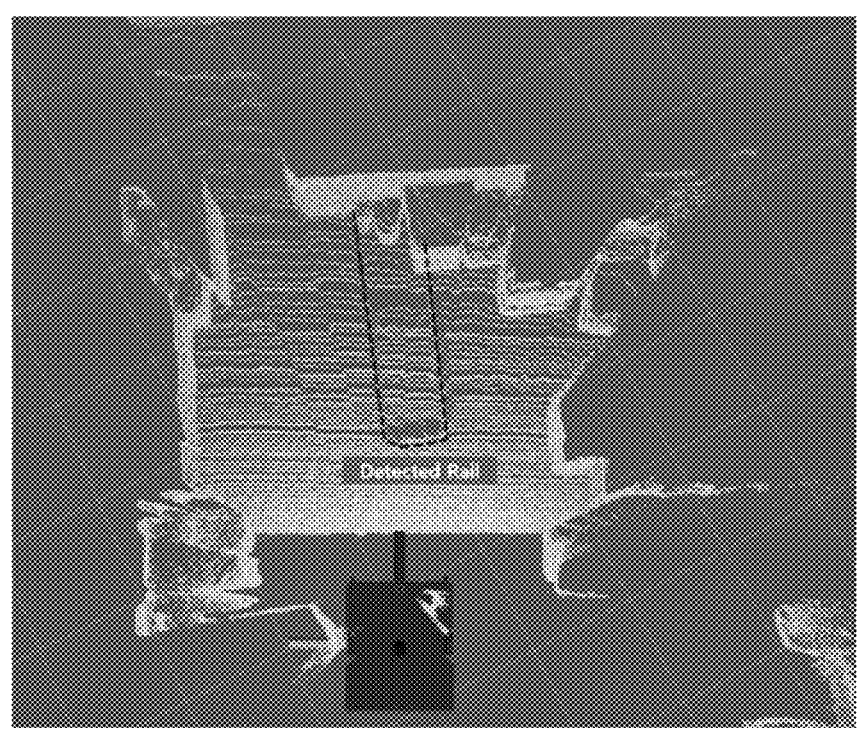
FIG. 10 illustrates an example of a detected position of a rail.

FIG. 10 illustrates an example of a detected position of a rail.

4. Control of Rail Docking Motion

Figure 11:
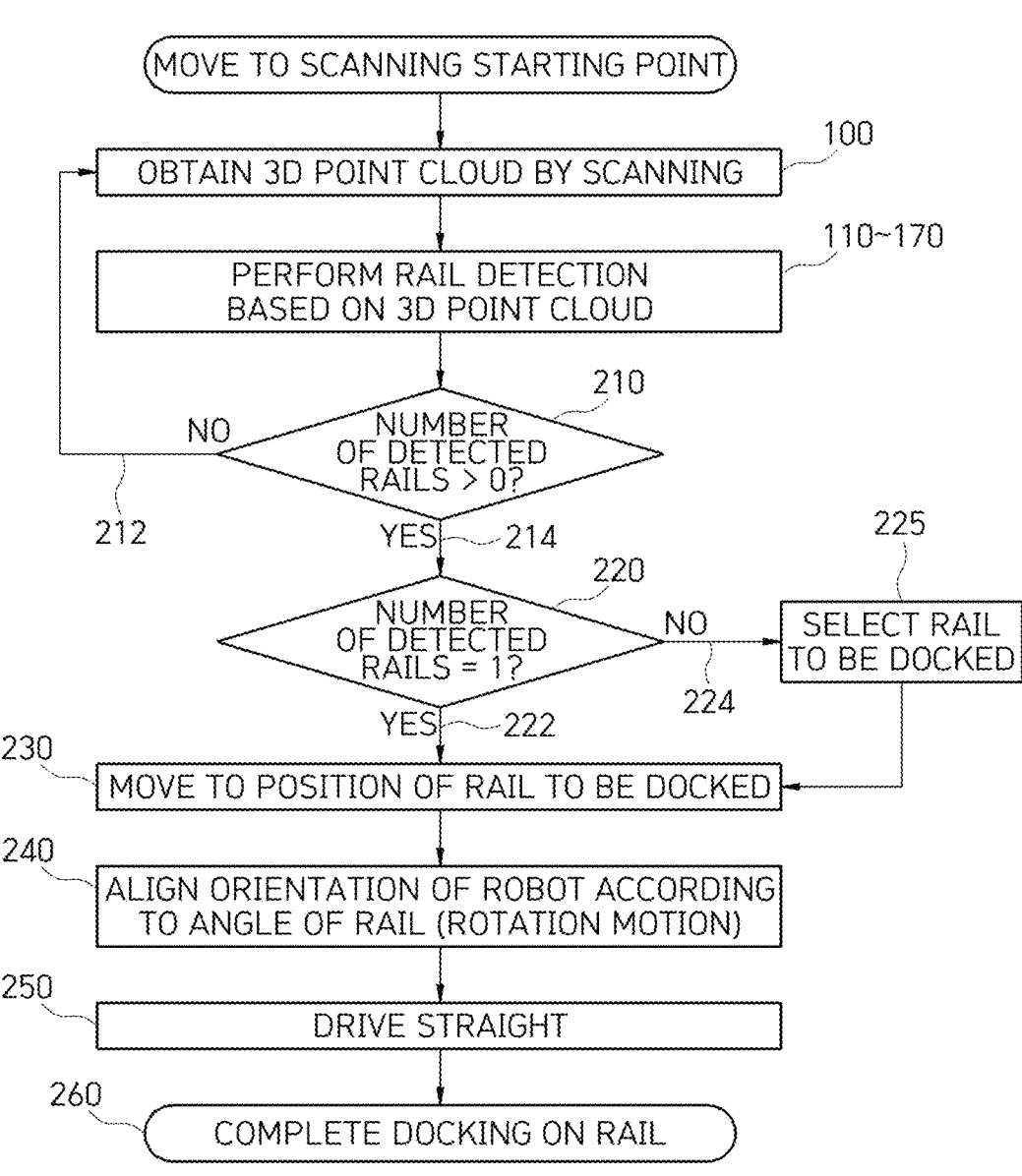
FIG. 11 is a flowchart of a control method of a motion of a mobile robot for rail docking according to an embodiment of the present disclosure.

As described above, after the position of the rail is detected, a motion of a mobile robot for rail docking is controlled. A process of controlling a motion of a mobile robot for rail docking is as shown in FIG. 11. As described above with reference to FIG. 4, FIG. 11 describes a motion control method in the form of a flowchart but a motion control apparatus according to another aspect of the present disclosure may also be easily implemented through the flowchart of FIG. 11.

A rail docking motion control method and apparatus according to the present disclosure will be described below with reference to FIG. 11.

First, a rail detection process (operations 100 to 170) as described above is performed to perform rail detection based on a 3D point cloud. Whether there are detected rails (number>0) or not (number=0) is determined according to a result of rail detection (210). When the number of detected rails is zero (212), the process of FIG. 4 is returned to and rails are detected by obtaining data about a 3D point cloud (100) and detecting a rail on the basis of the 3D point cloud (110 to 170).

When rails are detected (214), whether the number of the detected rails is one or two or more is determined again (220). When one rail is detected (222), the mobile robot is moved to a position of the rail to be docked on the rail (230). However, when two or more rails are detected (224), a rail to be docked is selected (225) and thereafter the mobile robot is moved to a position of the selected rail (230). After moving the mobile robot to the position on the rail to be docked (230), an angle formed with respect to the rail is identified, and the mobile robot is controlled to perform a rotation motion to align the mobile robot with the rail according to the angle (240). After the alignment of the mobile robot with the rail, the mobile robot is controlled to drive straight (250). Accordingly, the mobile robot may be docked on the rail (260).

When multiple rails are detected, a position of a rail closest to a current position of the mobile robot is selected as a position of a rail to be docked.

Figure 12:
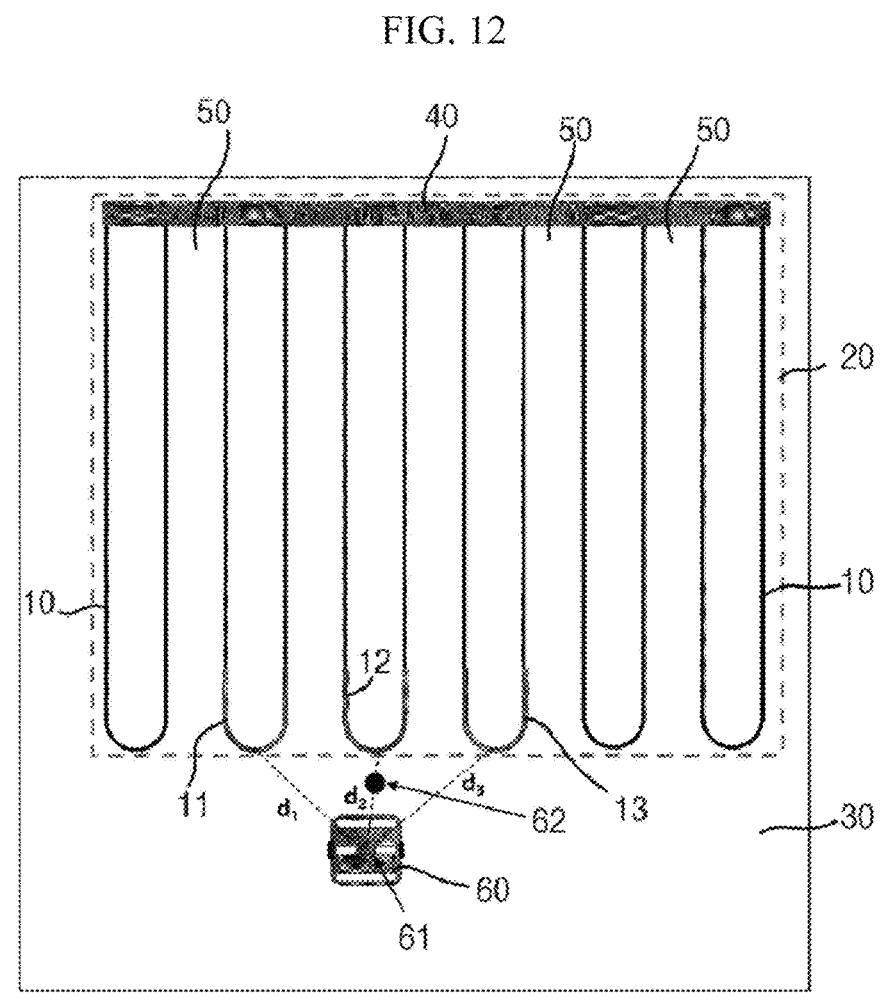

Specifically, referring to FIG. 12, when multiple rails 11, 12, and 13 are detected, a linear distance d2 among linear distances d1 to d3 between a midpoint 61 (a 3D scanning point for rail detection) on a mobile robot 60 and the detected rails 11, 12, and 13 is shortest. Therefore, the rail 12 is selected as a rail to be docked from among these detected rails. After selecting the rail 12, the mobile robot 60 is moved to a movement point "62" for rail docking, an orientation (a heading angle) of the mobile robot 60 is aligned with a linear direction that is the same as an orientation of the rail 12, and thereafter the mobile robot 60 drives straight to be docked on the rail 12.

While the configurations of the present disclosure have been described above in detail with reference to the accompanying drawings, the configurations are merely examples and various modifications and changes may be made therein within the scope of the present disclosure by those of ordinary skill in the technical field to which the present disclosure pertains. Therefore, the scope of the present disclosure is not limited to the aforementioned embodiments and should be defined by the following claims.

The invention claimed is:

1. A rail detection apparatus for autonomous driving of a mobile robot in an environment in a greenhouse in which a rail is installed on a ground, the apparatus comprising:
   a sensor configured to be mounted in a mobile robot to be docked;
   a rail detection unit configured to obtain data about a three-dimensional (3D) point cloud using the sensor and detect a position of the rail using the data about the 3D point cloud; and
   a rail docking motion control unit configured to control a docking motion of the mobile robot;
   wherein the rail docking motion control unit is configured to:
   determine whether a number of detected rails is one or two or more as a result of performing rail detection by the rail detection unit on the basis of the 3D point cloud;
   move the mobile robot to a position of the one rail, or if two or more rails are detected, select a rail of the two or more rails and move the mobile robot to a position of the selected rail;
   identify an angle formed with respect to the one rail or the selected rail after moving the mobile robot;
   align an orientation of the mobile robot with the one rail or the selected rail according to the identified angle; and
   allow the mobile robot to drive straight after aligning the orientation of the mobile robot with the one rail or the selected rail.

2. The apparatus of claim 1, wherein the sensor comprises a tilting laser scanner.

3. The apparatus of claim 1, wherein the rail detection unit is configured to:

set a region-of-interest (ROI) by removing points that are not included in a preset range of a z-axis from the data about the 3D point cloud;

extract rail candidate points by removing points on a plane from among points included in the extracted ROI;

extract a plurality of rail candidate clusters for points remaining after the points on the plane are removed;

extract two major lines that are longer than or equal to a preset length in units of the extracted rail candidate clusters;

verify a rail candidate according to an angle formed by the two major lines and a distance between the two major lines; and extract the position of the one rail or the position of the selected rail by matching the rail candidate verified as a success and the 3D point cloud.

4. The apparatus of claim 3, wherein the rail detection unit uses the preset range of the z-axis to set the ROI, wherein the preset range of the z-axis is from −0.1 m to 0.1 m, where m denotes meters.

5. The apparatus of claim 3, wherein the rail detection unit performs conditional Euclidean clustering to extract the rail candidate clusters.

6. The apparatus of claim 3, wherein the rail detection unit determines that a result of the verification of the rail candidate is a success when the angle between the major lines is less than 10° and the distance between the major lines is 0.5 to 0.7 m.

7. The apparatus of claim 3, wherein the rail detection unit performs iterative closest point (ICP) matching using a pre-built 3D point cloud type rail model for matching the rail candidate verified as a success and the 3D point cloud.

8. A rail detection method for autonomous driving of a mobile robot in an environment in a greenhouse in which rails are installed on a ground, the method comprising:

obtaining data about a three-dimensional (3D) point cloud using a sensor mounted in a mobile robot to be docked;

detecting a position of the rail using the data about the 3D point cloud; and controlling a rail docking motion to control a docking motion of the mobile robot, wherein the controlling of the rail docking motion comprises:

determining whether a number of detected rails is one or two or more as a result of performing rail detection based on the 3D point cloud;

moving the mobile robot to a position of the one rail, or if two or more rails are detected, selecting a rail of the two or more rails and moving the mobile robot to a position of the selected rail;

identifying an angle formed with respect to the one rail or the selected rail after moving the mobile robot;

aligning an orientation of the mobile robot with the one rail or the selected rail according to the identified angle; and allowing the mobile robot to drive straight after aligning the orientation of the mobile robot with the one rail or the selected rail.

9. The method of claim 8, wherein the sensor comprises a tilting laser scanner.

10. The method of claim 8, wherein the detecting of the rail comprises:

setting a region-of-interest (ROI) by removing points that are not included in a preset range of a z-axis from the data about the 3D point cloud;

extracting rail candidate points by removing points on a plane from among points included in the extracted ROI;

extracting a plurality of rail candidate clusters for points remaining after the points on the plane are removed;

extracting two major lines that are longer than or equal to a preset length in units of the extracted rail candidate clusters;

verifying a rail candidate according to an angle formed by the two major lines and a distance between the two major lines; and extracting the position of the one rail or the position of the selected rail by matching the rail candidate verified as a success and the 3D point cloud.

11. The method of claim 10, wherein the detecting of the rail comprises using the preset range of the z-axis to set the ROI, wherein the preset range of the z-axis is from −0.1 m to 0.1 m, where m denotes meters.

12. The method of claim 10, wherein the detecting of the rail comprises performing conditional Euclidean clustering to extract the rail candidate clusters.

13. The method of claim 10, wherein the detecting of the rail comprises determining that a result of the verifying of the rail candidate is success when an angle between lines forming the major lines is less than 10° and a distance between the major lines is 0.5 to 0.7 m.

14. The method of claim 10, wherein the detecting of the rail comprises performing iterative closest point (ICP) matching using a pre-built 3D point cloud type rail model for matching the rail candidate verified as a success and the 3D point cloud.

* * * * *